US009425910B2

(12) United States Patent
Rathonyi et al.

(10) Patent No.: US 9,425,910 B2
(45) Date of Patent: Aug. 23, 2016

(54) HANDLING OF PUBLIC WARNING NOTIFICATIONS IN A MOBILE COMMUNICATION SYSTEM

(71) Applicant: Telefonaktiebolaget L M Ericsson (publ), Stockholm (SE)

(72) Inventors: Bela Rathonyi, Lomma (SE); Jagadeesh Arunachalam, Malmo (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/373,356

(22) PCT Filed: Jan. 21, 2013

(86) PCT No.: PCT/EP2013/051039
§ 371 (c)(1),
(2) Date: Jul. 19, 2014

(87) PCT Pub. No.: WO2013/110568
PCT Pub. Date: Aug. 1, 2013

(65) Prior Publication Data
US 2014/0357183 A1  Dec. 4, 2014

Related U.S. Application Data

(60) Provisional application No. 61/590,929, filed on Jan. 26, 2012.

(30) Foreign Application Priority Data

Jan. 24, 2012 (EP) ..................................... 12152300

(51) Int. Cl.
*H04H 20/59* (2008.01)
*H04W 4/22* (2009.01)
(Continued)

(52) U.S. Cl.
CPC ............ *H04H 20/59* (2013.01); *G08B 27/008* (2013.01); *H04H 20/71* (2013.01); *H04L 69/40* (2013.01);
(Continued)

(58) Field of Classification Search
None
See application file for complete search history.

(56) References Cited

U.S. PATENT DOCUMENTS

2008/0082543 A1* 4/2008 Abhishek .............. H04W 48/18
2010/0035575 A1* 2/2010 Wu ........................ H04W 4/22
455/404.1

(Continued)

FOREIGN PATENT DOCUMENTS

FR  2 857 210 A1  1/2005
WO  2005/120179 A2  12/2005

(Continued)

OTHER PUBLICATIONS

PCT International Search Report, mailed Jun. 21, 2013, in connection with International Application No. PCT/EP2013/051039, all pages.

(Continued)

*Primary Examiner* — Alejandro Rivero
(74) *Attorney, Agent, or Firm* — Leffler Intellectual Property Law, PLLC

(57) ABSTRACT

Processing of public warning notifications in a mobile communication terminal is disclosed, the terminal being camped on a cell belonging to a first public land mobile network, PLMN. A first warning notification is received, and information contained in the first warning notification is provided to a user of the mobile communication terminal. Radio reception conditions are analyzed and, depending on results of the analysis of radio reception conditions, a secondary public warning notification, SN, is received from a second PLMN. Information contained in the SN is then provided to the user of the mobile communication terminal.

14 Claims, 3 Drawing Sheets

(51) Int. Cl.
| | |
|---|---|
| *H04W 76/00* | (2009.01) |
| *G08B 27/00* | (2006.01) |
| *H04L 29/14* | (2006.01) |
| *H04W 48/12* | (2009.01) |
| *H04H 20/71* | (2008.01) |
| *H04W 48/20* | (2009.01) |
| *H04W 36/14* | (2009.01) |

(52) U.S. Cl.
CPC ............. *H04W 4/22* (2013.01); *H04W 48/12* (2013.01); *H04W 76/007* (2013.01); *H04W 36/14* (2013.01); *H04W 48/20* (2013.01)

(56) References Cited

U.S. PATENT DOCUMENTS

| | | | | |
|---|---|---|---|---|
| 2011/0003600 A2* | 1/2011 | Beckmann | ............ | H04L 12/189 455/455 |
| 2013/0064176 A1* | 3/2013 | Hsu | ......................... | H04W 4/02 370/328 |
| 2014/0179258 A1* | 6/2014 | Arzelier | ................. | H04W 4/22 455/404.1 |

FOREIGN PATENT DOCUMENTS

| | | |
|---|---|---|
| WO | 2009/039200 A1 | 3/2009 |
| WO | 2010/019090 A1 | 2/2010 |

OTHER PUBLICATIONS

PCT Written Opinion, mailed Jun. 21, 2013, in connection with International Application No. PCT/EP2013/051039, all pages.

Jindra, Martin "National roaming—an incomplete contracts approach", Oct. 31, 2004, XP055027048, University of Freiburg, Germany, pp. 1-16. Retrieved from the Internet: URL:http://www.infraday.tu-berlin.de/typo3/fileadmin/documents/infraday/2004/papers/Jindra-National_roaming.pdf [retrieved on May 14, 2012].

ETSI TS 122 168, V8.2.0 "Earthquake and Tsunami Warning System (ETWS) requirements; Stage 1 (3GPP TS 22.168 Version 8.2.0, Release 8)" pp. 1-14, ETSI, Sophia Antipolis, Cedex, France, Mar. 2012.

ETSI TS 123 041, V10.6.0 "Technical Realization of Cell Broadcast Service (CBS) (3GPP TS 23.041 Version 10.6.0, Release 10)" pp. 1-55, ETSI, Sophia Antipolis, Cedex, France, Jan. 2013.

3GPP TS 22. 168, V8.3.0 Earthquake and Tsunami Warning System (ETWS) requirements; Stage 1 (Release 8), pp. 1-12, 3GPP, Sophia Antipolis, Valbonne, France, Dec. 2012.

3GPP TS 25.331 "Resource Control (RRC) Protocol Specification Release 10", Version 10.5.0, all pages, 3GPP, Sophia Antipolis, Cedex, France, Sep. 2011.

* cited by examiner

HANDLING OF PUBLIC WARNING NOTIFICATIONS IN A MOBILE COMMUNICATION SYSTEM

CROSS-REFERENCE TO RELATED APPLICATIONS

This application claims priority under 35 U.S.C. §119 to European Patent Application No. 12152300.5, filed Jan. 24, 2012, which is hereby incorporated herein by reference in its entirety. This application also claims the benefit of U.S. Provisional Application No. 61/590,929, filed Jan. 26, 2012, which is hereby incorporated herein by reference in its entirety.

BACKGROUND

With the rapid increase in the number of mobile communication terminals in virtually all parts of the world during the last decade, it is not surprising that network operators and other parties including governments and non-governmental organizations have begun providing services that can alert mobile terminal users of emergencies such as natural disasters in the form of earthquakes and tsunamis etc. The general concept is that detections of emergencies are collected at specific detection centres and these detections are then formulated into warning notifications and messages that are distributed via mobile communication network operators to the users of communication terminals that are subscribers in the networks.

Recently, the 3rd generation partnership project (3GPP) has standardized such public warning systems (PWS). For example, the earthquake and tsunami warning system (ETWS), the commercial mobile alert system (CMAS) and the EU-Alert System. These systems use cell broadcast service, CBS, as the underlying technology, in e.g. GSM and WCDMA systems, to broadcast emergency messages to the users. CBS is a 3GPP feature in which a number of short unacknowledged messages can be broadcasted to all mobile communication terminals (UE) in a particular region. After the standardization of these systems, CBS has obtained increased interest from operators, network vendors and UE manufacturers. The earthquake early warning system which is being deployed in Japanese networks also uses CBS for broadcasting emergency messages.

However, a drawback associated with the use of CBS is one of high battery consumption in the mobile communication terminals when the service is enabled. In fact, for a terminal which has CBS enabled, the battery life is reduced by half or more. The battery consumption problem is reduced to a certain extent in the ETWS system since the CBS reception is enabled only after a primary notification (PN) is received. During the periods during which these notifications are transmitted, it is important that the UE stays powered on to receive further emergency CBS messages in the form of so-called secondary notifications (SN).

For example, tests have shown that power consumption for a UE enabled to receive CBS messages with Level 2 discontinuous reception (DRX) is 2.3 mA and 2.75 mA if the repetition period is 40 seconds and 20 seconds, respectively. When CBS is disabled, the UE consumes 1.945 mA. For a UE that utilizes level 1 DRX, the power consumption is significantly higher than that when level 2 DRX is utilized.

Another problem with the current warning systems that use CBS for the secondary notifications is that, after the primary notification has been received, the UE will follow normal cell re-selection rules without taking the aspect of successfully reception of CBS messages into account. This may in some situations, e.g. areas with reduced radio coverage, lead to that it either takes very long time to retrieve secondary notifications or they are not received at all due to too many cyclic redundancy check (CRC) errors.

SUMMARY

It is an object of the present disclosure to overcome drawbacks with prior art systems and therefore, in a first aspect, a method is provided for processing public warning notifications in a mobile communication terminal, the terminal being camped on a cell belonging to a first public land mobile network, PLMN. The method comprises receiving a first warning notification, and information contained in the first warning notification is provided to a user of the mobile communication terminal. Radio reception conditions are analyzed and, depending on results of the analysis of radio reception conditions, a secondary public warning notification, SN, is received from a second PLMN. Information contained in the SN is then provided to the user of the mobile communication terminal.

In other words, a terminal that has received a first warning notification when camping in a first PLMN will optimize the reception of important secondary notifications by being able to obtain transmissions in radio cells belonging to other PLMNs. This is advantageous in areas where radio cells of the PLMN in which the terminal is camping have reduced radio coverage. By obtaining secondary notifications from another PLMN, unnecessary delays can be avoided in situations where it may be essential that information in secondary notifications is delivered as soon as possible.

The reception of the first warning notification may comprise reception of a primary notification, PN, from the first PLMN or reception from the second PLMN.

That is, unnecessary delays can be avoided also in situations where a primary notification cannot be received from the first PLMN, for example when one or more transmitting stations of the first PLMN have been disrupted by the event, earthquake etc., that occasioned the warning in the first place.

Alternatively, the method may comprise detecting notification triggering user input, and in such cases the reception of the first warning notification comprises reception of a notification signal generated in the mobile communication terminal in response to the detection of the notification triggering user input.

That is, a user may himself/herself realize that an emergency is imminent and instead of, or prior to, reception of a notification from a PLMN, trigger a procedure that enables the reception of a secondary notification. Such a triggering may entail pressing a key or speaking into a microphone or any other appropriate interaction with the communication terminal.

The mobile communication terminal may be camped on a cell belonging to any of a home PLMN and a visited PLMN. In such cases, the reception of the SN may comprise reception from a cell belonging to a PLMN that is none of a home PLMN and a visited PLMN.

The analysis of radio reception conditions may comprise a number of different procedures. For example, determining that data reception in the camped on cell is flawed in terms of any of error rate and delay in relation to data reception in a non-camped on cell. The analysis may also comprise a cell selection criteria calculation in respect of at least one cell on which the mobile communication terminal is not camped on.

Moreover, the analysis may also comprise determining that at least one cell on which the mobile communication terminal is not camped on is capable of supporting cell broadcast service, CBS, discontinuous reception, DRX, level 2 scheduling.

That is, if the cell on which the UE is camped does not support CBS DRX level 2 scheduling but another non-camped cell does, then the UE will receive secondary notification data from the cell which supports level 2 scheduling and thereby reduce the power consumption in the terminal.

The analysis of radio reception conditions may comprise analyzing radio reception conditions in a plurality of cells on which the mobile communication terminal is not camped on, and, based on results from the analysis compiling a list of cells that can provide the SN, and may further comprise selecting, from the compiled list of cells, a cell from which to perform the reception of the SN.

The reception of the PN may comprise reception of a paging message as well as a broadcast message.

An alert may be provided to the user of the mobile communication terminal that any of the PN and the SN is received from a PLMN with which the mobile communication terminal is not associated.

That is, by providing an alert to the fact that information is received from a PLMN with which the terminal is not associated the user is provided with an additional level of security in situations where there is some doubt whether there is an emergency or not. In other words, so-called "spoofing" radio base stations may be identified in such embodiments.

In a second aspect there is provided a mobile communication terminal, the terminal configured to be camped on a cell belonging to a first public land mobile network, PLMN. The terminal comprises receiving means configured to receive a first warning notification, output means configured to provide information contained in the first warning notification to a user of the mobile communication terminal, processing means configured to analyze radio reception conditions, and configured to, depending on results of the analysis of radio reception conditions, control the receiving means to receive a secondary public warning notification, SN, from a second PLMN, and output means configured to provide information contained in the SN to the user of the mobile communication terminal.

In a third aspect there is provided a computer program product comprising software instructions that, when executed in a processor, perform the method as summarized above.

The terminal according to the second aspect and the computer program product according to the third aspect provide effects and advantages that correspond to the effects and advantages as summarized above in connection with the method according to the first aspect.

BRIEF DESCRIPTION OF THE DRAWINGS

The disclosure will now continue with a more detailed description of some embodiments where reference will be made to the drawings on which.

DETAILED DESCRIPTION

Figure 1:
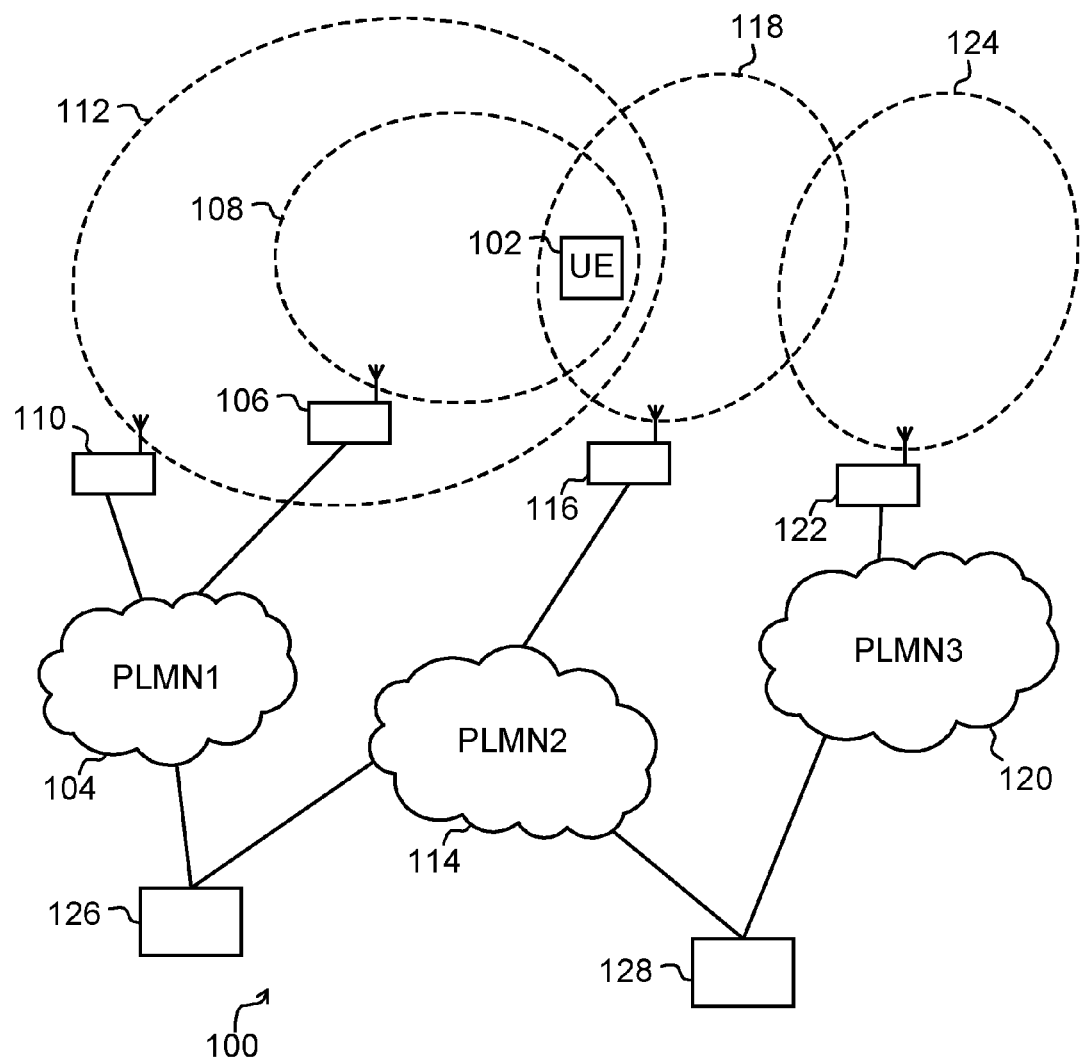
FIG. 1 schematically illustrates mobile communication systems.

FIG. 1 illustrates a geographical area 100 in which an emergency such as an earthquake may occur. The area 100 is at least partly covered by radio cells, as exemplified by cells 108, 112, 118, 124, each belonging to a respective public land mobile network, PLMN1 104, PLMN2 114 or PLMN3 120. Each radio cell 108, 112, 118, 124 is served by a respective radio base station 106, 110, 116, 122. Needless to say, the normal operation of the PLMN's 104, 114, 120 and their associated base stations 106, 110, 116, 122, as well as the fact that such networks typically comprise a much larger number of communicating entities, is known to the skilled person and will hence not be described in detail in the following. Moreover, although the following description will use terminology associated with 3GPP UMTS/UTRAN, the skilled person will realize without using inventive skills that the methods and arrangements that will be described may be realized in other similar radio communication systems.

A mobile communication terminal 102 is registered with an operator of PLMN1 104 and is located in the radio cell 108 served by base station 106. The terminal 102 is also within boundaries of the radio cell 118 served by the base station 116 belonging to PLMN2 114. The terminal 102 is also almost within reach of the radio cell 124 of PLMN3 120.

A first emergency warning provider 126 and a second emergency warning provider 128 are connected to the PLMN's 104, 114, and 120 as schematically illustrated. These emergency warning providers 126 and 128 collect information regarding emergencies such as earthquakes, tsunamis and other types of more or less unforeseen events that require that a large number of people are alerted within minutes or even seconds. The means needed to provide the connections between the emergency warning providers and the PLMN's are known to the skilled person and will hence be disregarded for the sake of avoiding the risk of cluttering the description with unnecessary details.

As will be described in more detail below, information about emergency events are collected by the emergency warning providers 126, 128 and provided via the PLMN's 104, 114 and 120 to the mobile communication terminal 102, which is in the hands of a user who is to receive notifications and information regarding the emergency events in such a manner that the user can take appropriate actions.

Figure 2:
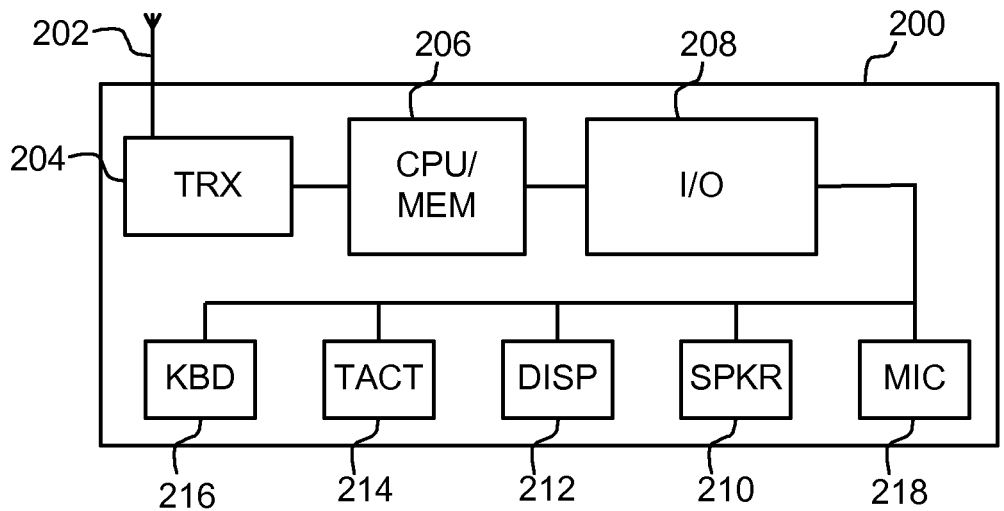
FIG. 2 is a schematically illustrated block diagram of a mobile communication terminal.

FIG. 2 is a schematically presented block diagram of a mobile communication terminal 200 or, as denoted in UMTS/UTRAN systems, a user equipment UE. The terminal 200 may be a terminal such as the terminal 102 in FIG. 1. The terminal comprises a number of functional blocks: a combined reception and transmission antenna 202, a radio transceiver 204, a processor 206 comprising memory circuitry, a user input/output controller 208 and user output units in the form of an audio output unit 210, a display 212, a tactile output unit 214, a keypad 216 and a microphone 218. As the skilled person will realize, these input/output units may be individual units or more or less hybrid constructions, for example a combined keypad and display in the form of a touch screen.

In addition to being configured to control the terminal 200 during normal operation in a PLMN, the processor 206 is configured to register the terminal 200 in the first public land mobile network PLMN1 104. The receiver 204 with its connected antenna 202 is, together with appropriate parts of the processor 206 and the user input/output units 208, 210, 212, 214, 216, 218 configured to receive a primary public warning notification PN. As will be exemplified in more detail below, the primary notification PN may originate from a number of different sources. The processor 206 and the output units are further configured to provide information contained in the received primary notification PN, for example in the form of text on the display 212, sound in the audio output unit 210 and vibration in the tactile output unit 214, making the information visible to the user of the terminal 200.

The processor 206 is further configured to analyze radio reception conditions, and configured to, depending on results of the analysis of radio reception conditions, control the receiver 204 to receive a secondary public warning notification, SN, from a second public land mobile network PLMN2 114, in which second network PLMN2 114 the terminal 200 is not registered.

The processor 206 and the output units are further configured to provide information contained in the received secondary notification SN, for example in the form of text on the display 212 making the information visible to the user of the terminal 200.

Now with reference to the flowchart in FIG. 3 and with continued reference to FIGS. 1 and 2, a method for processing public warning notifications in a mobile communication terminal, such as the terminal 200, will be described. The initial state of the terminal is that it is camping on a radio cell belonging to a first public land mobile network PLMN1 104.

In a reception step 302, a first warning notification, PN, is received. Depending on the implementation, the reception of the first warning notification may comprise reception of a primary notification, PN, from the first PLMN or reception of a PN from the second PLMN. With the example of FIG. 1 in mind, the first PLMN may be PLMN1 104 and the second PLMN may be any of PLMN2 114 and PLMN3 120. Alternatively, the reception of the first warning notification in reception step 302 may be of a more complex form and comprise a detection of notification triggering user input, and in such cases the reception of the first warning notification comprises reception of a notification signal generated in the mobile communication terminal 200 in response to the detection of the notification triggering user input. The notification triggering user input may for example be input by the user via the keypad 216 or the microphone 218.

In an output step 304, information contained in the first warning notification is provided to a user of the mobile communication terminal 200. For example, the information may be displayed on the display 212 or audio output representing the information may be played via the audio output unit 210.

In an analysis step 306, radio reception conditions are analyzed and, depending on results of the analysis of radio reception conditions, a secondary public warning notification, SN, is received, in a reception step 308, from a second PLMN. With the example of FIG. 1 in mind, the second PLMN may be any of PLMN2 114 and PLMN3 120.

In an output step 310, information contained in the SN is then provided to the user of the mobile communication terminal. Similar to output step 304, the information of the secondary notification SN may for example be displayed on the display 212 or audio output representing the information may be played via the audio output unit 210.

Figure 3:
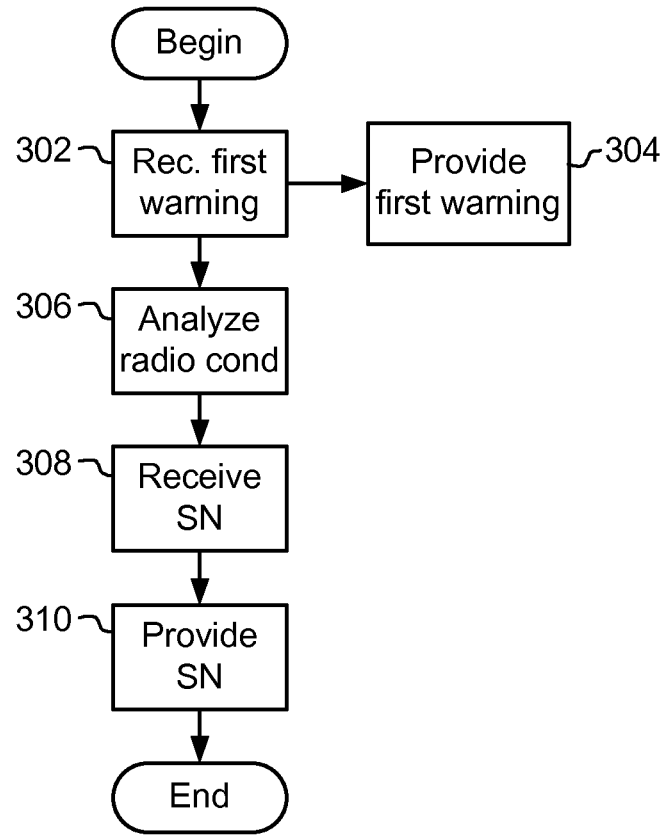
FIG. 3 is a flowchart of an embodiment of a method for processing public warning notifications.

An extension to the embodiment described in FIG. 3 is one in which an alert is provided, in an alerting step, to the user of the mobile communication terminal, where the alert informs the user that any of the PN and the SN is received from a PLMN in which the mobile communication terminal is not registered. As is known to exist, so-called "spoofing" base stations may try to gain control of mobile communication terminals for more or less illicit purposes. Therefore, in embodiments that makes use of such an extension with an alerting step, the user is provided with an additional level of security in situations where there is some doubt whether there is an emergency or not. In other words, "spoofing" radio base stations may be identified and appropriate action may be taken, such as simply ignoring the notification.

Figure 4:
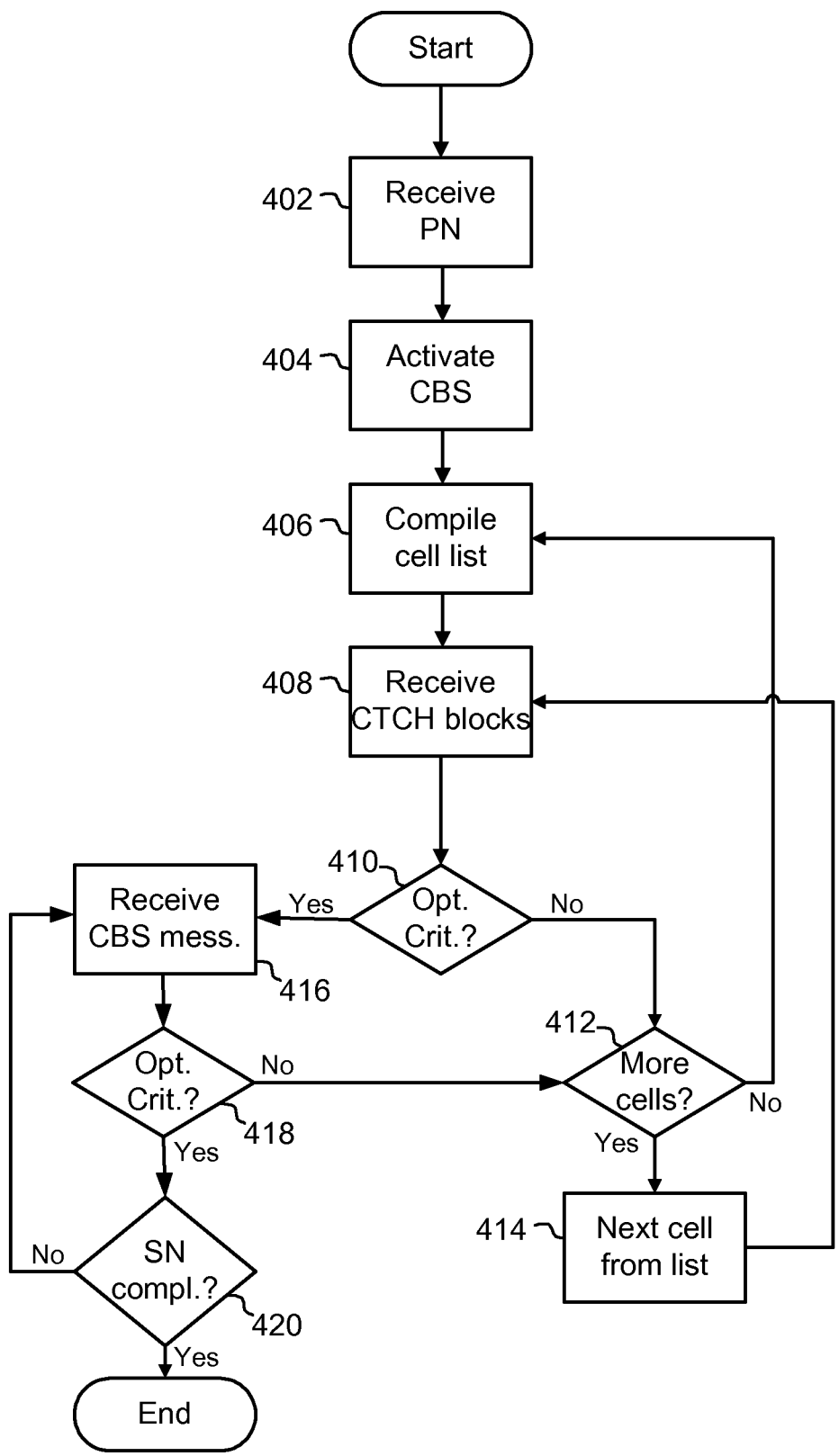
FIG. 4 is a flowchart of another embodiment of a method for processing public warning notifications.

Turning now to FIG. 4, another embodiment of a method for processing public warning notifications in a mobile communication terminal will be described. References will be made also to FIGS. 1 and 2. It is to be noted that the embodiment of FIG. 4 will be described as an implementation in an environment where a plurality of UMTS/UTRAN networks are in existence. However, as the skilled person will realize, the method can be realized also in an environment where one or more GSM and/or 3GPP LTE systems operate.

In this embodiment, the user equipment UE 102 is registered in PLMN1 104 and is camping on the radio cell 108. The UE 102 supports cell broadcast service CBS and is capable of receiving cell broadcast CB messages on the logical common traffic channel CTCH. The CTCH is mapped to the transport forward access channel FACH which in turn is mapped to the secondary common control physical channel S-CCPCH. The CTCH "occasions" are transmitted in system information block SIB5 and system information block SIB6 comprising the following information:
CTCH identification
FACH identification and the associated transport format set
S-CCPCH identification
CBS DRX Level 1 information
  Period of CTCH allocation on S-CCPCH
  CBS frame offset In a reception step 402, the UE 102 receives a primary notification from for example a paging type 1 message. The primary notification is a short message of one or two octets in length which warns the user of an imminent occurrence of an earthquake or a tsunami.

In an activation step 404, CBS reception is enabled in the UE 102.

In a compilation step 406, measurements are made of radio conditions in terms of S-criteria for all radio cells that are present at the location of the UE 102. A list of all measured cells that satisfy the S-Criteria is compiled and the best cell per PLMN is chosen for the list. This is the list of cells in which the UE later may attempt to read CTCH blocks from. This list will then be continuously updated based on measurements performed by the UE.

In a reception step 408, the UE reads the master information block MIB on the camped cell 108 to find out the scheduling information of SIB5 or SIB6 and then, unless reception is flawed as checked in a checking step 410, the UE starts receiving the CBS data from the CTCH in a reception step 416.

If the reception of the CBS data is not optimized, i.e. if the reception is flawed, according to pre-defined criteria, for example if there are problems with the reception such as too many errors or the reception takes too long time, or the received cell does not support level 2 CBS scheduling, then the UE starts to receive CBS data from other cells from the compiled list, i.e. any of the cells 112, 118, 124, in order to determine if more optimized reception can be achieved. This is illustrated by checking step 418, checking step 412 and step 414, and performed while the UE is still being camped on the same cell 108 (which is the best cell according to normal PLMN/cell selection criteria) and optionally (by configuration) continued reception of the CBS data from the cell 108 until it is determined that another cell is better.

When determining if another cell is better for CBS reception, as checked in checking step 410, the UE reads the CTCH blocks of that cell during a (configureable) time duration in order to determine, for example, if the reception quality is better (e.g. there are fewer CRC errors) compared to any other cell from the compiled list or if there is a message indicating level 2 scheduling (a CB schedule message).

Checking step 418 can either be done for all cells in the compiled list or until some criteria like error rate and/or existence of level 2 scheduling are met for a cell. As long as the criteria in checking step 418 are fulfilled the reception of CBS data will be done from that cell as illustrated by reception step 416 and a checking step 420 in which a check is made whether all CBS messages that make up a SN has been received.

To summarize some advantages provided by the present disclosure, it provides a way of optimizing the reception of secondary notifications according to, for example, time to retrieve the information and/or the battery consumption in the terminal. It is to be expected that there will be strong interest from for example network operators for a battery efficient implementation of CBS. This disclosure will provide a solution.

Also, the probability of receiving CBS messages is increased for a UE behaving according to the embodiments described above.

Furthermore, during an emergency such as an Earthquake, a network node or transmission link in a PLMN located in a particular geographical area could be destroyed and become non-functioning. Then there is a risk that it would not be possible for UE's belonging to that PLMN to receive any CBS messages. Hence, if the UE reads CTCH blocks from cells belonging to another PLMN, it will be able to receive secondary notifications. Otherwise, the UE's will miss important information due to that the PLMN in which they are camping is not fully functional.

It is also to be noted that an UE that operates as described above fulfils all the 3GPP requirements such as cell re-selection criteria etc. Consequently the method described in the present disclosure is not a violation of any standard specifications.

The invention claimed is:

1. A method for processing public warning notifications in a mobile communication terminal, the terminal being camped on a cell belonging to a first public land mobile network (PLMN), the method comprising:
while camped on the cell belonging to the first PLMN, receiving a first warning notification;
providing information contained in the first warning notification to a user of the mobile communication terminal;
analyzing radio reception conditions;
depending on results of the analysis of radio reception conditions, while the terminal is still camped on the cell belonging to the first PLMN, receiving a secondary public warning notification (SN) from a second PLMN; and
providing information contained in the SN to the user of the mobile communication terminal.

2. The method of claim 1, wherein:
the reception of the first warning notification comprises reception of a primary notification (PN) from the first PLMN.

3. The method of claim 1, wherein:
the reception of the first warning notification comprises reception of a primary notification (PN) from the second PLMN.

4. The method of claim 1, comprising:
detecting notification triggering user input that triggers a notification signal generated in the mobile communication terminal that enables the reception of the secondary notification, and wherein:
the reception of the first warning notification comprises reception of the notification signal.

5. The method of claim 1, the mobile communication terminal being camped on a cell belonging to any of a home PLMN and a visited PLMN, wherein:
the reception of the SN comprises reception from a cell belonging to a PLMN that is none of a home PLMN and a visited PLMN.

6. The method of claim 1, wherein:
the analysis of radio reception conditions comprises determining that data reception in the camped on cell is flawed in terms of any of error rate and delay in relation to data reception in a non-camped on cell.

7. The method of claim 1, wherein:
the analysis of radio reception conditions comprises a cell selection criteria calculation in respect of at least one cell on which the mobile communication terminal is not camped on.

8. The method of claim 1, wherein:
the analysis of radio reception conditions comprises determining that at least one cell on which the mobile communication terminal is not camped on is capable of supporting cell broadcast service (CBS), discontinuous reception (DRX), level 2 scheduling.

9. The method of claim 1, wherein:
the analysis of radio reception conditions comprises analyzing radio reception conditions in a plurality of cells on which the mobile communication terminal is not camped on, and, based on results from the analysis:
compiling a list of cells that can provide the SN, and further comprising:
selecting, from the compiled list of cells, a cell from which to perform the reception of the SN.

10. The method of claim 1, wherein:
the reception of the first warning notification comprises reception of a paging message.

11. The method of claim 1, wherein:
the reception of the SN comprises reception of a broadcast message.

12. The method of claim 1, further comprising:
providing an alert to the user of the mobile communication terminal that any of the first warning notification and the SN is received from a PLMN with which the mobile communication terminal is not associated.

13. A mobile communication terminal, the terminal configured to be camped on a cell belonging to a first public land mobile network (PLMN), the terminal comprising:
receiving means configured to receive a first warning notification while camped on the cell belonging to the first PLMN;
output means configured to provide information contained in the first warning notification to a user of the mobile communication terminal;
processing means configured to analyze radio reception conditions, and configured to, depending on results of the analysis of radio reception conditions, control the receiving means, while camped on the cell belonging to the first PLMN, to receive a secondary public warning notification (SN) from a second PLMN; and
output means configured to provide information contained in the SN to the user of the mobile communication terminal.

14. A nontransitory processor-readable storage medium comprising software instructions that, when executed in a processor, cause the processor to perform a method for processing public warning notifications in a mobile communication terminal, the terminal being camped on a cell belonging to a first public land mobile network (PLMN), the method comprising:
while camped on the cell belonging to the first PLMN, receiving a first warning notification;

providing information contained in the first warning notification to a user of the mobile communication terminal;
analyzing radio reception conditions;
depending on results of the analysis of radio reception conditions, while the terminal is still camped on the cell belonging to the first PLMN, receiving a secondary public warning notification (SN) from a second PLMN; and
providing information contained in the SN to the user of the mobile communication terminal.

* * * * *